United States Patent
Tomita et al.

(10) Patent No.: US 6,263,704 B1
(45) Date of Patent: Jul. 24, 2001

(54) QUARTZ GLASS, HEAT TREATING APPARATUS USING QUARTZ GLASS, AND HEAT TREATING METHOD

(75) Inventors: Hiroshi Tomita, Yokohama; Tsuneo Ishii, Yamagata-ken; Chie Hongo, Yokohama, all of (JP)

(73) Assignees: Kabushiki Kaisha Toshiba, Kawasaki (JP); Toshiba Ceramics., Ltd., Tokyo (JP)

( * ) Notice: Subject to any disclaimer, the term of this patent is extended or adjusted under 35 U.S.C. 154(b) by 0 days.

(21) Appl. No.: 09/584,721

(22) Filed: Jun. 1, 2000

Related U.S. Application Data (62) Division of application No. 09/085,006, filed on May 28, 1998, now Pat. No. 6,093,666.

(30) Foreign Application Priority Data

May 30, 1997 (JP) ................................... 9-141906

(51) Int. Cl.$^7$ ............................ C03C 19/00; C03C 23/00; C03C 21/00
(52) U.S. Cl. ................. 65/30.13; 65/61; 451/38; 451/41
(58) Field of Search ............... 65/30.1, 30.13, 65/61; 451/38, 41; 501/32, 34

(56) References Cited

U.S. PATENT DOCUMENTS

| | | | |
|---|---|---|---|
| 2,608,800 | * 9/1952 | Ritter ........................................ 45/38 |
| 3,776,809 | * 12/1973 | Baumler et al. ...................... 138/140 |
| 4,106,859 | * 8/1978 | Doriguzzi et al. .................... 349/113 |
| 4,277,522 | * 7/1981 | Dorfeld ................................ 427/292 |
| 5,364,433 | 11/1994 | Nishimura et al. ................... 65/17.4 |
| 5,523,266 | 6/1996 | Nishimura et al. ..................... 501/54 |
| 5,616,159 | 4/1997 | Araujo et al. .......................... 65/17.4 |
| 5,707,908 | 1/1998 | Komine et al. ......................... 501/53 |
| 5,896,222 | 4/1999 | Rosplock et al. ..................... 359/355 |
| 5,958,170 | * 9/1999 | Cetrangolo ........................... 156/247 |
| 5,958,809 | 9/1999 | Fujiwara et al. ........................ 501/54 |

FOREIGN PATENT DOCUMENTS

| | | |
|---|---|---|
| 1 696 061 | 10/1971 | (DE) . |
| 738630 | 10/1955 | (GB) . |
| 4-130031 | 5/1992 | (JP) . |
| 9807053 A2 | 2/1998 | (WO) . |

OTHER PUBLICATIONS

Shelby, J.E., "Radiation effects in hydrogen–impregnated vitreous silica", Journal of Applied Physics, 50(5), pp. 3702–3706, May 1979.

* cited by examiner

*Primary Examiner*—Sean Vincent
(74) *Attorney, Agent, or Firm*—Finnegan, Henderson, Farabow, Garrett & Dunner, L.L.P.

(57) ABSTRACT

A quartz glass which would not become a source for the contamination even if it contains metallic impurities. This quartz glass includes a region where a concentration of E' center as measured by means of an electron spin resonance analysis is $3 \times 10^{19}$ cm$^{-3}$ or more. This quartz glass can be manufactured by a method including the steps of forming an initial quartz glass by melting and quenching a raw material for quartz glass, and implanting therein an ion, which is capable of entering into an SiO$_2$ network of the initial quartz glass and substantially incapable of externally diffusing, to increase a concentration of E' center in at least part of the initial quartz glass. This quartz glass can be manufactured by a method making use of a quartz glass raw material containing 0.01 to 0.1% by weight of silicon, by a method of irradiating ultraviolet ray to the initial quartz glass, or by a method of giving an abrasion damage to the surface of the initial quartz glass by means of sand blast.

8 Claims, 6 Drawing Sheets

QUARTZ GLASS, HEAT TREATING APPARATUS USING QUARTZ GLASS, AND HEAT TREATING METHOD

This is a division of application Ser. No. 09/085,006, filed May 28, 1998 now U.S. Pat. No. 6,093,666.

BACKGROUND OF THE INVENTION

This invention relates to a quartz glass, in particular to a quartz glass for use as a structural material for a heat treating apparatus to be employed in a semiconductor manufacturing process, and to a method manufacturing the quartz glass. This invention also relates to a heat treating apparatus using the quartz and to a heat treating method using the quartz.

A heat treating apparatus is employed as one of the apparatus to be employed in a semiconductor manufacturing process. In the heat treating apparatus of this kind, a quartz glass is employed as a structural material for a furnace tube, a wafer boat, etc., because the employment of quartz glass is advantageous in various aspects, e.g. it is available in high purity or it is excellent in heat resistance.

Even if a quartz glass of a high purity is employed as a structural material, it is difficult to prevent the surface of a silicon wafer from being contaminated with a metal such as Cu and Fe when the silicon wafer is heat-treated at a high temperature of 1,000° C. or more. The percent defective of a semiconductor device which is manufactured by making use of a silicon wafer containing a relatively large quantity of metallic contaminants originated from a heat treating furnace is higher than that of a semiconductor device manufactured by making use of a silicon wafer which is free from the metallic contaminants.

The causes for the contamination of a silicon wafer with metals in its treatment inside a heat treating furnace may be attributed to the following facts.

First of all, metallic impurities which are contained in various external members (such as a heater, liner tube made of silicon carbide, etc.) disposed outside the quartz glass furnace tube and are large in diffusion coefficient in quartz glass are caused to evaporate from the surfaces of these external members, the evaporated metallic impurities being subsequently adsorbed on the external wall of the quartz glass furnace tube. The metallic impurities thus adsorbed are then diffused into the interior of the quartz glass furnace tube to reach the inner wall of the furnace tube, from which the metallic impurities are caused to be desorbed whereby contaminating a silicon wafer with the desorbed metallic impurities (a first cause).

Secondary, metallic impurities originally contained in the quartz glass furnace tube are caused to diffuse up to the surface of the furnace tube, from which the metallic impurities are caused to be desorbed whereby contaminating a silicon wafer with the desorbed metallic impurities (a second cause).

For the purpose of minimizing the metallic contamination to be brought about by these causes, a method of improving the purity of bulk of the constituent members of heat treating apparatus has been mainly adopted. For example, in the case of the quartz glass furnace tube, the following methods have been adopted to improve the purity of the quartz glass.

Namely, a method of enhancing the purity of natural quartz crystal as a raw material for quartz glass (a first method); a method of employing silicon tetrachloride or a synthetic amorphous silica to be obtained by means of sol-gel method (a second method); a method of enhancing the purity of the ingot to be obtained by melting a raw material (a third method); and a method consisting of a combination of two or more of the aforementioned first to third methods (a fourth method).

It is possible according to these methods to decrease the content of metallic impurities in a quartz glass down to 0.3 ppm or less, or down to 0.1 ppm or less depending on the kinds of metallic impurities. When a quartz glass of such a high purity is employed as a structural material for a furnace tube, the metallic contamination (transfer) of a silicon wafer can be minimized, and hence the percent defective of a semiconductor device can be correspondingly minimized.

At present, although it is possible to manufacture a quartz glass having a metallic impurity content of 0.3 ppm (0.1 ppm), it is still impossible to manufacture a quartz glass which is completely free from metallic impurities, i.e. the technique of enhancing the purity of quartz glass is now being nearly deadlocked.

Even if it has become possible to manufacture a quartz glass which is completely free from metallic impurities so as to solve the problem of contamination with metallic impurities originating from the aforementioned second cause, it is still impossible to solve the problem of contamination with metallic impurities originating from the aforementioned first cause.

Further, in view of a recent trend to further increase the integration of integrated circuit, a higher cleanness in the process of manufacturing a 1G bit DRAM, etc. than at present is now demanded. In order to meet such a demand, it is required not only to minimize the metallic impurities in a quartz glass so as to manufacture a high-purity quartz glass, but also to prevent a high-purity quartz glass from being contaminated by metallic impurities coming from outside the quartz glass.

As mentioned above, according to the conventional heat treating apparatus, even if the purity of quartz glass to be employed as a structural material of a furnace tube is enhanced, it has been impossible to prevent the furnace tube (quartz glass) from being contaminated by metallic impurities coming from various members disposed outside the quartz glass, thus resulting in the contamination of a silicon wafer.

BRIEF SUMMARY OF THE INVENTION

Therefore, an object of this invention is to provide a quartz glass, which would not become a source for the contamination even if it contains metallic impurities.

Another object of this invention is to provide a method of manufacturing a quartz glass, which would not become a source for the contamination even if it contains metallic impurities.

A further object of this invention is to provide a heat treating apparatus, which is capable of minimizing the contamination of a semiconductor wafer with metallic impurities.

A still further object of this invention is to provide a heat treating method, which is capable of minimizing the contamination of a semiconductor wafer with metallic impurities.

Namely, according to the present invention, there is provided a quartz glass comprising a region where a concentration of E' center as measured by means of an electron spin resonance analysis is $3 \times 10^{19}$ cm$^{-3}$ or more.

According to the present invention, there is further provided a method of manufacturing a quartz glass which comprises the steps of;

forming an initial quartz glass by melting and quenching a raw material for quartz glass; and implanting therein an ion, which is capable of entering into an $SiO_2$ network of the initial quartz glass and substantially incapable of externally diffusing, to increase a concentration of E' center in at least part of the initial quartz glass.

There is further provided a method of manufacturing a quartz glass which comprises the steps of;

mixing 0.01 to 0.1% by weight of silicon into a raw material for quartz glass;

melting the raw material for quartz glass mixed with the silicon to obtain a melt; and quenching the melt.

This invention further provides a method of manufacturing a quartz glass which comprises the steps of;

melting a raw material for quartz glass to obtain a melt;

quenching the melt thereby to form an initial quartz glass; and irradiating ultraviolet-rays to the initial quartz glass.

According to the present invention, there is further provided a method of manufacturing a quartz glass which comprises the steps of;

melting a raw material for quartz glass to obtain a melt;

quenching the melt thereby to form an initial quartz glass; and giving an abrasion damage to a surface of the initial quartz glass by applying a sand blast to the surface of initial quartz glass.

According to the present invention, there is further provided a heat treating apparatus comprising;

a furnace tube formed of quartz glass comprising a region where a concentration of E' center as measured by means of an electron spin resonance analysis is $3 \times 10^{19}$ $cm^{-3}$ or more; and heating means mounted around the furnace tube.

According to the present invention, there is further provided a method of heat-treating a semiconductor wafer, which comprises the steps of;

arranging the semiconductor wafer in a furnace tube formed of quartz glass comprising a region where a concentration of E' center as measured by means of an electron spin resonance analysis is $3 \times 10^{19}$ $cm^{-3}$ or more; and heat-treating the semiconductor wafer while flowing a non-oxidizing gas in such a manner that the non-oxidizing gas contacts directly with an outer wall of the furnace tube.

According to the present invention, there is further provided a method of heat-treating a semiconductor wafer, which comprises the steps of;

arranging the semiconductor wafer in a furnace tube formed of quartz glass comprising a region where a concentration of E' center as measured by means of an electron spin resonance analysis is $3 \times 10^{19}$ $cm^{-3}$ or more; and heat-treating the semiconductor wafer while irradiating ultraviolet rays onto the furnace tube.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinbefore.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

DETAILED DESCRIPTION OF THE INVENTION

According to a first embodiment of this invention, there is provided a quartz glass comprising a region where a concentration of E' center as measured by means of an electron spin resonance analysis is $3 \times 10^{19}$ $cm^{-3}$ or more.

The term "E' center" herein means silicon atom which has three balance bonds each having oxygen atom bonded thereto and one balance bond without any atoms.

There is not any particular limitation regarding the upper limit of the concentration of E' center. However, if the concentration of E' center exceeds over $1 \times 10^{22}$ $cm^{-3}$, the strength of the quartz glass may be lowered. Accordingly, the concentration of E' center is preferably at most $1 \times 10^{22}$ $cm^{-3}$. More preferably, the concentration of E' center is $7 \times 10^{19}$ $cm^{-3}$ or more.

It has been found as a result of studies made by the present inventors that metallic impurities can be effectively trapped by a region (E' center region) where the concentration of E' center is $3 \times 10^{19}$ cm$^{-3}$ or more. If a quartz glass is consisted of the one which contains such an E' center region, the metallic impurities existing in the interior of the quartz glass can be prevented from being desorbed outside, and hence the quartz glass can be prevented from becoming a contamination source.

Additionally, even if metallic impurities coming from outside adhere onto the surface of a quartz glass and diffuse into the interior of the quartz glass, the metallic impurities can be effectively trapped by the E' center region, so that the quartz glass can be prevented, also in this case, from becoming a contamination source.

According to a second embodiment of this invention, there is provided a method of manufacturing the aforementioned quartz glass. As for the method of manufacturing the aforementioned quartz glass, the following methods can be adopted.

(1) A method comprising the steps of forming an initial quartz glass by melting and quenching a raw material for quartz glass, and implanting therein an ion, which is capable of entering into an SiO$_2$ network of the initial quartz glass and substantially incapable of externally diffusing, to increase a concentration of E' center in at least part of the initial quartz glass.

Of course, the ions to be implanted into the initial quartz glass should preferably be selected from those which are completely incapable of diffusing outside. However, as a matter of fact, such ions are not existed in a strict sense. Therefore, the expression of "substantially incapable of externally diffusing" is employed in this invention.

Specific examples of ions to be implanted into the initial quartz glass are silicon, nitrogen, carbon and aluminum. By the way, by the expression of "initial quartz glass", it is meant a state of quartz glass prior to intentionally form a region containing the E' center.

The dosage of the ion to be implanted into the initial quartz glass should preferably be $5 \times 10^{14}$ cm$^{-2}$ or more, more preferably $1 \times 10^{15}$ or more, most preferably in the range of from $1 \times 10^{15}$ cm$^{-2}$ to $1 \times 10^{16}$ cm$^{-2}$.

It is also possible to form the E' center region throughout the entire region of the quartz glass, thereby making it possible to more effectively trap the metallic impurities existing inside the quartz glass. p (2) A method comprising the steps of mixing 0.01 to 0.1% by weight of silicon into a raw material for quartz glass, melting the raw material for quartz glass mixed with the silicon to obtain a melt, and finally quenching the melt.

(3) A method comprising the steps of melting a raw material for quartz glass to obtain a melt, quenching the melt thereby to form an initial quartz glass, and irradiating ultraviolet-rays to the initial quartz glass.

(4) A method comprising the steps of melting a raw material for quartz glass to obtain a melt, quenching the melt thereby to form an initial quartz glass, and giving an abrasion damage to a surface of the initial quartz glass by applying a sand blast to the surface of initial quartz glass.

The concentration of E' center is measured immediately after the above methods are performed.

According to a third embodiment of this invention, there is provided a heat treating apparatus for a semiconductor wafer, which comprises a furnace tube formed of the aforementioned quartz glass. This heat treating apparatus may comprises ultraviolet-irradiating means for irradiating ultraviolet rays to the furnace tube.

According to a fourth embodiment of this invention, there is provided a method of heat-treating a semiconductor wafer by making use of the aforementioned heat treating apparatus.

According to this heat treating method, the heat treatment is performed while flowing a non-oxidizing gas in such a manner that the non-oxidizing gas contacts directly with an outer wall of said furnace tube comprising the aforementioned quartz glass. The reason for flowing a non-oxidizing gas in this method is to perform a heat treatment without diminishing the E' center, i.e. in the presence of the E' center.

In this case, the concentration of oxidizing gas that may be included in the non-oxidizing gas may preferably be 100 ppm or less. If the content of oxidizing gas is more than 100 ppm, the E' center may be restored by the oxygen in the oxidizing gas, thus decreasing the quantity of the E' center. As a result, the quantity of keep the metallic impurities in the quartz glass may be diminished. As for the nonoxidizing gas, nitrogen gas, hydrogen gas and an inert gas such as argon gas, etc. may be employed.

By the way, an ion implantation method or a back side damaging method has been conventionally known as a gettering method of a silicon substrate. The damage layer to be formed by these methods is amorphous. However, since a silicon substrate is fundamentally formed of single crystal, the damage layer may be restored to single crystal under any heat treatment conditions.

Namely, it is impossible in the case of a single crystal silicon substrate to achieve an effect of effectively trapping metallic impurities. Whereas, in the case of a quartz glass which is inherently amorphous, if the heat treatment is performed in a non-oxidizing atmosphere, the amorphous damage layer (a region where the concentration of E' center is $3 \times 10^{19}$ cm$^{-3}$ or more) may be remained as it is, thus making it possible to ensure an effect of effectively trapping metallic impurities.

In the case of this invention, the concentration of E' center ($3 \times 10^{19}$ cm$^{-3}$ or more) in a quartz glass is very important. This concentration of E' center can be easily controlled, since the quartz glass is amorphous. However, since the silicon substrate is formed of single crystal, it is almost impossible to control the concentration of the E' center.

This invention will be further explained with reference to the following examples and to the drawings.

EXAMPLE 1

First of all, a quartz glass board according to a first embodiment of this invention will be explained.

Figure 1:
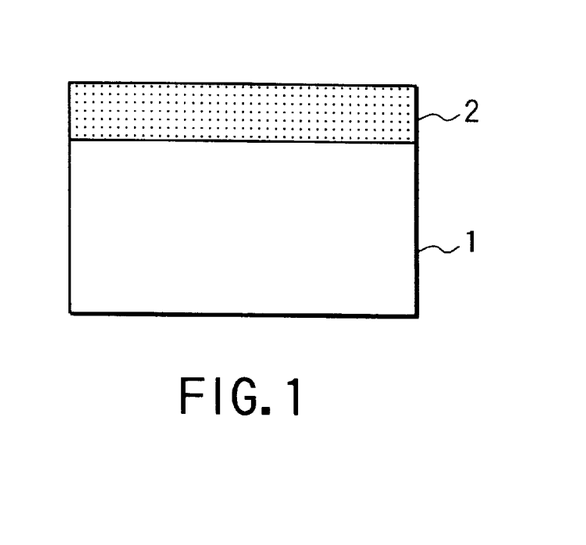
FIG. 1 is a cross-sectional view of a quartz glass board which has been employed in an experiment to demonstrate the principle of this invention.

FIG. 1 shows a quartz glass board which has been employed in an experiment to illustrate the fundamental principle of this invention. Referring to FIG. 1, the reference numeral 1 denotes a quartz glass board, on the surface of which a region 2 containing the E' center (hereinafter referred to as an E' center region 2) is formed. This E' center region 2 has been formed by implanting silicon ions into the surface of the quartz glass board 1.

The quartz glass board 1 having the E' center region 2 formed therein is then introduced into a vacuum vessel together with a silicon wafer whose surface has been deposited with a Cu layer. Then, the quartz glass board 1 and the silicon wafer are subjected to a heat treatment in a vacuum atmosphere at a temperature of 800° C. for 30 minutes.

As a result of this heat treatment, Cu is scattered from the silicon wafer and then adsorbed on the surface of the quartz glass board 1. The Cu thus adsorbed on the surface of the quartz glass board 1 was then diffused into the interior of the quartz glass board 1, but was trapped as it was diffused into a depth of 150 nm to 400 nm from the surface of the quartz glass board 1.

Then, another experiment was performed in the same manner as mentioned above except that the concentration of E' center of the E' center region 2 was changed. As a result, the quantity of Cu that has been trapped in the quartz glass board 1 was also found as being changed. Therefore, a relationship between the concentration of E' center and an average concentration of Cu (hereinafter referred to as an average quantity of Cu capture) at a region locating at a depth of from 100 to 400 nm from the surface of the quartz glass board 1 was investigated. In this case, the concentration of E' center of the E' center region 2 was measured by means of an electron spin resonance analysis.

Figure 2:
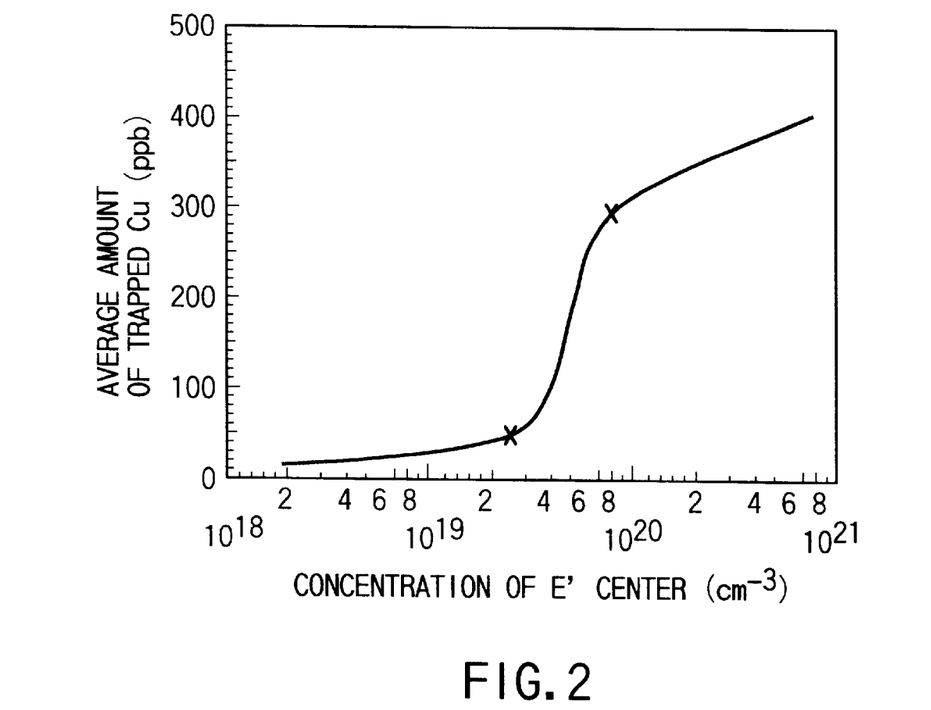
FIG. 2 is a graph illustrating a relationship between the concentration of E' center and an average quantity of trapped Cu.

FIG. 2 shows the results of this experiment. As seen from FIG. 2, it has been found that when the concentration of E' center in the quartz glass board 1 was $3 \times 10^{19}$ cm$^{-3}$ or more, the average quantity of Cu capture was sharply increased, and when the concentration of E' center was $7 \times 10^{19}$ cm$^{-3}$ or more, the average quantity of Cu capture was further increased.

Therefore, it will be understood that by employing a quartz glass board 1 having an E' center concentration of $3 \times 10^{19}$ cm$^{-3}$ or more, more preferably $7 \times 10^{19}$ cm$^{-3}$ or more, the contamination of a silicon wafer due to Cu contained in the quartz glass board 1 can be effectively prevented. In this case, the Cu contained in the quartz glass board 1 may be the one which has been originally existed in the quartz glass board or may be the one which has come from outside and diffused into the interior of the quartz glass board 1.

In this example, a board of quartz glass was exemplified. However, this invention is also applicable to other kinds of shape such as a tubular quartz glass.

EXAMPLE 2

Figure 3A:
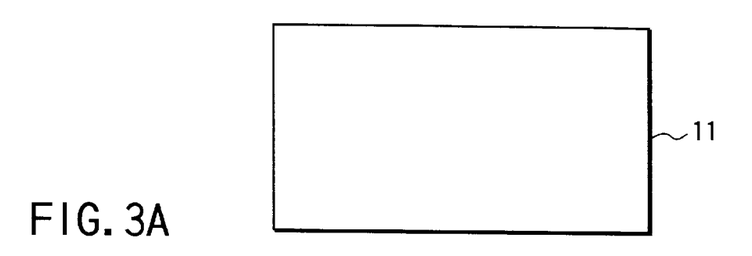
FIGS. 3A and 3B are cross-sectional views sequentially illustrating the steps of manufacturing a quartz glass board according to a second example of this invention.
Figure 3B:
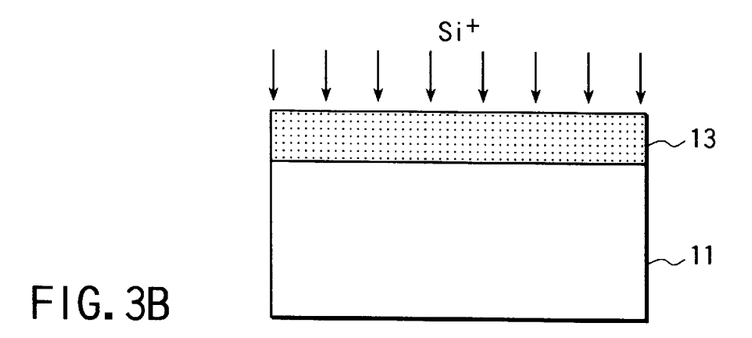

FIGS. 3A and 3B are cross-sectional views sequentially illustrating the steps of manufacturing a quartz glass board according to a second example of this invention.

First of all, as shown in FIG. 3A, quartz was allowed to melt according a well known method, and then quenched to form an initial quartz glass 11. In this example, a board of initial quartz glass (an initial quartz glass board) was manufactured. However, this invention is also applicable to other kinds of shape such as a tubular quartz glass.

Subsequently, as shown in FIG. 3B, silicon ions were implanted into the surface of the initial quartz glass board 11 whereby to form an E' center region 13 in the surface region of the initial quartz glass board 11, thus manufacturing a quartz glass board.

Then, another quartz glass board was prepared in the same manner as mentioned above except that the quantity of silicon ions implanted was changed. As a result, the concentration of E' center was also found as being changed. Therefore, a relationship between the concentration of E' center and the quantity of silicon ions implanted was investigated.

Figure 4:
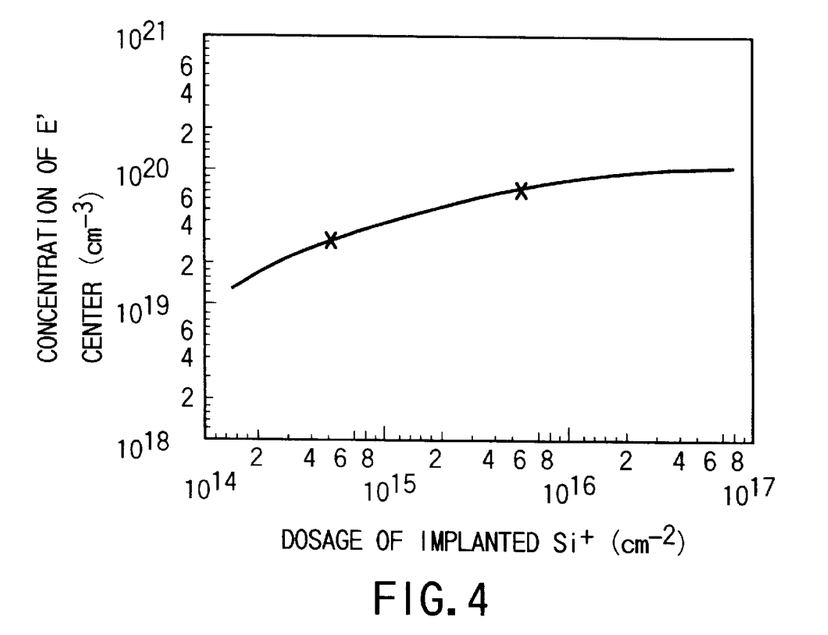
FIG. 4 is a graph illustrating a relationship between the concentration of E' center and a quantity of implanting silicon ion ($Si^+$)

FIG. 4 shows the results of this experiment. As seen from FIG. 4, it has been found that when the dosage of silicon ion implanted was $5 \times 10^{14}$ cm$^{-2}$ or more, an E' center region having a concentration of $3 \times 10^{19}$ cm$^{-3}$ or more in E' center can be formed, and that when the dosage of silicon ion implanted was $5 \times 10^{16}$ cm$^{-2}$ or more, an E' center region having a concentration of $7 \times 10^{19}$ cm$^{-3}$ or more in E' center can be formed.

Therefore, it will be understood that by ion-implanting silicon ion (Si$^+$) at a dosage of $5 \times 10^{14}$ cm$^{-2}$ or more, more preferably at a dosage of $5 \times 10^{16}$ cm$^{-2}$ or more, it is possible to obtain a quartz glass board which is capable of effectively preventing the contamination of a silicon wafer due to metallic impurities such as Cu which may exist in the interior of the quartz glass.

In this example, silicon ion was implanted for the purpose of forming the E' center region. However, other kinds of ion such as nitrogen, carbon, aluminum, etc. may be substituted for the silicon ion.

The point is to implant an ion which is capable of increasing the concentration of the E' center in the interior of the initial quartz glass, and of entering into the SiO$_2$ network of the initial quartz glass, and is incapable of easily diffusing outside.

EXAMPLE 3

Next, a method of manufacturing a quartz glass board according to a third example of this invention will be explained.

First of all, natural quartz crystal powder (raw material for quartz glass) having a particle diameter of 100 μm and a high purity silicon powder having a particle diameter of 100 μm were sufficiently mixed together to obtain a mixture. The content of the high purity silicon powder was set to 0.1% by weight. Then, this mixture was melted and quenched to form a quartz glass.

By the way, the high purity silicon powder may be mixed, in place of the natural quartz crystal powder, with an ordinary raw material for quartz glass such as a synthetic silica powder to be obtained by means of a sol-gel method or silicon tetrachloride powder.

Figure 5:
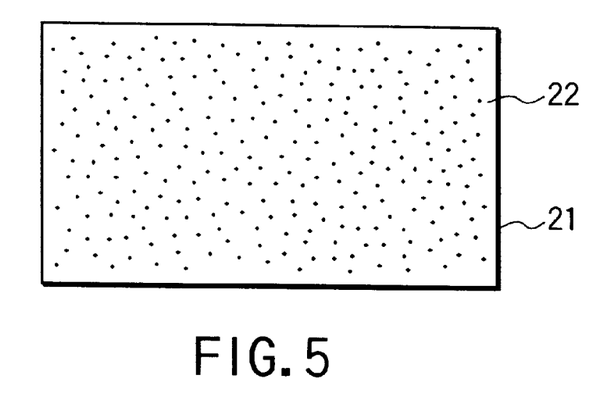
FIG. 5 is a cross-sectional view of a quartz glass board according to a third example of this invention.

According to this method, it is possible, as shown in FIG. 5, to form an E' center region 22 having a concentration of $3 \times 10^{19}$ cm$^{-3}$ or more of E' center throughout the quartz glass board 21. When the E' center region 22 is formed throughout the quartz glass board 21, the contamination by metallic impurities such as Cu existing in the interior of the quartz glass board 21 can be more effectively prevented.

By the way, although the concentration of the high purity silicon powder was set to 0.1% by weight in this example, it is possible to easily form the E' center region 22 having a concentration of $3 \times 10^{19}$ cm$^{-3}$ or more of E' center by setting the concentration of the high purity silicon powder to not less than 0.01% by weight.

However, if the concentration of the high purity silicon powder exceeds over 0.1% by weight, it may become difficult to keep a stabilized state of the quartz glass, thus making it difficult to utilize the quartz glass as a structural material of a heat treating apparatus. Therefore, the concentration of the high purity silicon powder should preferably be in the range of from 0.01% by weight to 0.1% by weight.

Figure 6A:
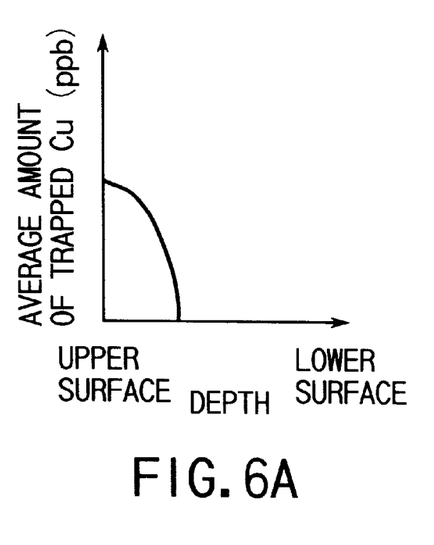
FIGS. 6A and 6B are diagrams illustrating the profiles of Cu concentration when E' center region is formed only the surface region of the glass board and when E' center region is formed throughout the entire region of the glass board, respectively.
Figure 6B:
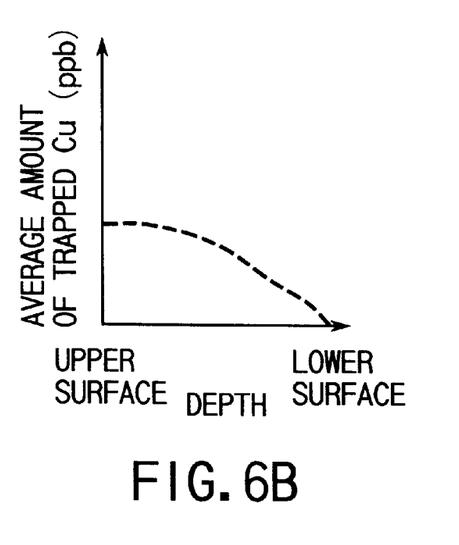

FIG. 6A shows a profile of Cu concentration when the E' center region was formed only the surface region of the quartz glass, whereas FIG. 6B shows a profile of Cu concentration when the E' center region was formed throughout the quartz glass.

EXAMPLE 4

Figure 7A:
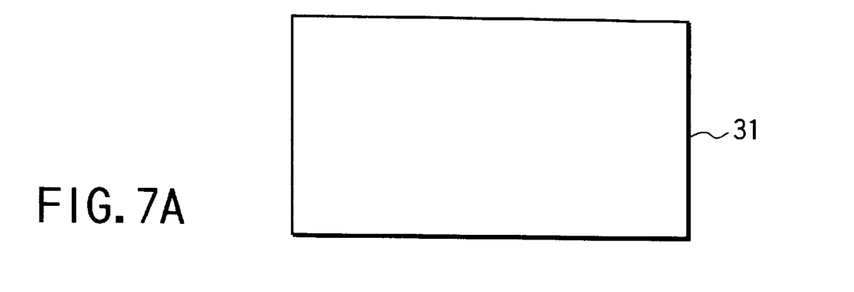
FIGS. 7A and 7B are cross-sectional views sequentially illustrating the steps of manufacturing a quartz glass board according to a fourth example of this invention.
Figure 7B:
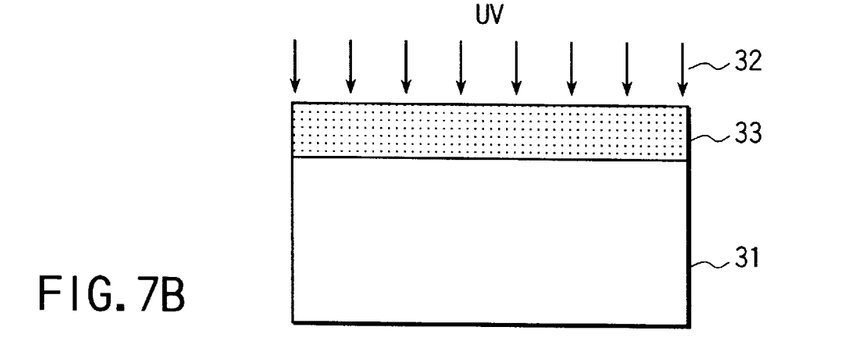

FIGS. 7A and 7B are cross-sectional views sequentially illustrating the steps of manufacturing a quartz glass board according to a fourth example of this invention.

First of all, as shown in FIG. 7A, quartz was allowed to melt according a well known method, and then quenched to form an initial quartz glass 31. In this example, a board of initial quartz glass (an initial quartz glass board) was manufactured. However, this invention is also applicable to other kinds of shape such as a tubular quartz glass.

Subsequently, as shown in FIG. 7B, the surface of the initial quartz glass board 31 was irradiated with ultraviolet ray 32 of 245 nm in wavelength for one minute, whereby to form an E' center region 33 having a concentration of $3\times10^{19}$ $cm^{-3}$ or more in E' center in the surface region of the initial quartz glass board 31, thus manufacturing a quartz glass board. As a result, almost the same effect as that of Example 2 was obtained in this example.

In this example, ultraviolet ray was irradiated for the purpose of forming the E' center region 33. However, it is also possible to employ, in place of ultraviolet ray, an electromagnetic wave such as X-ray, γ-ray, laser beam, etc. or a particle beam such as electron beam.

EXAMPLE 5

Figure 8A:
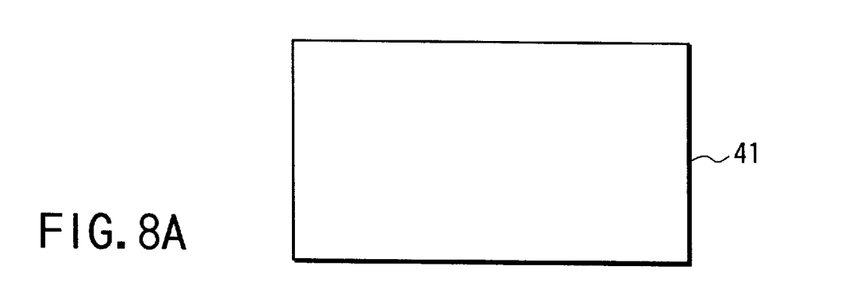
FIGS. 8A and 8B are cross-sectional views sequentially illustrating the steps of manufacturing a quartz glass board according to a fifth example of this invention.
Figure 8B:
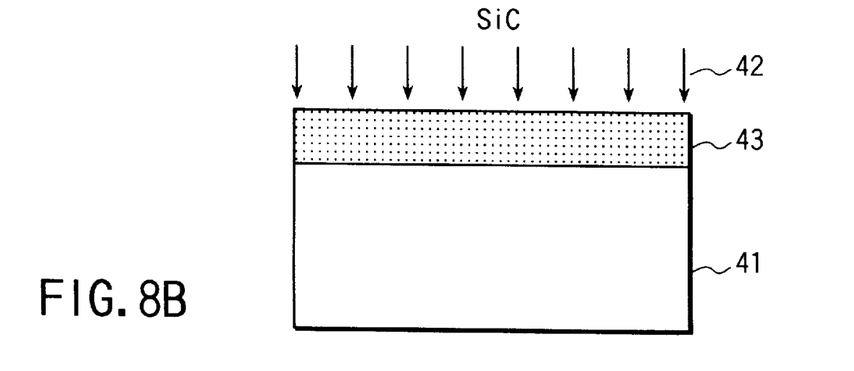

FIGS. 8A and 8B are cross-sectional views sequentially illustrating the steps of manufacturing a quartz glass board according to a fifth example of this invention.

First of all, as shown in FIG. 8A, quartz was allowed to melt according a well known method, and then quenched to form an initial quartz glass 41. In this example, a board of initial quartz glass (an initial quartz glass board) was manufactured. However, this invention is also applicable to other kinds of shape such as a tubular quartz glass.

Subsequently, as shown in FIG. 8B, the surface of the initial quartz glass board 41 was subjected to a blast of silicon carbide powder 42 having a particle diameter of 80 μm for 10 seconds at a pressure of 3 kg/cm², whereby to form an E' center region 43 having a concentration of $3\times10^{19}$ $cm^{-3}$ or more in E' center in the surface region of the initial quartz glass board 41, thus manufacturing a quartz glass board. As a result, almost the same effect as that of Example 2 was obtained in this example.

EXAMPLE 6

Figure 9:
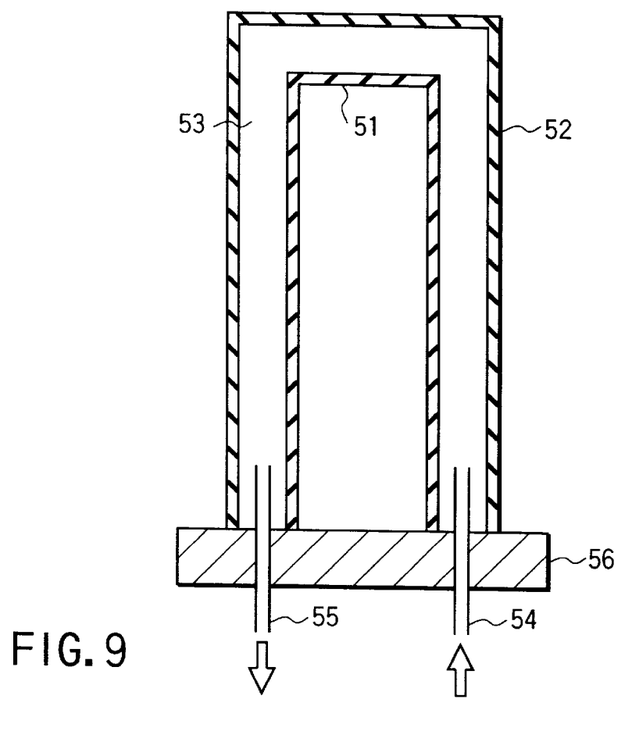
FIG. 9 is a cross-sectional view of the heat treating furnace of a heat treating apparatus according to a sixth example of this invention.

FIG. 9 is a cross-sectional view illustrating a main portion (heat treating furnace) of heat treating apparatus according to a sixth example of this invention.

A first feature of this example resides in the employment of a tubular quartz glass comprising an E' center region having a concentration of $3\times10^{19}$ $cm^{-3}$ or more in E' center as a furnace tube 51. It is most preferable to form the E' center region throughout the furnace tube 51. However, even if the E' center region is existed at least partially in the furnace tube 51, it is effective in improving the contamination with metallic impurities.

The furnace tube 51 may be formed of a 2-ply structure consisting of a quartz glass according to this invention and a quartz glass according to the prior art.

Figure 10A:
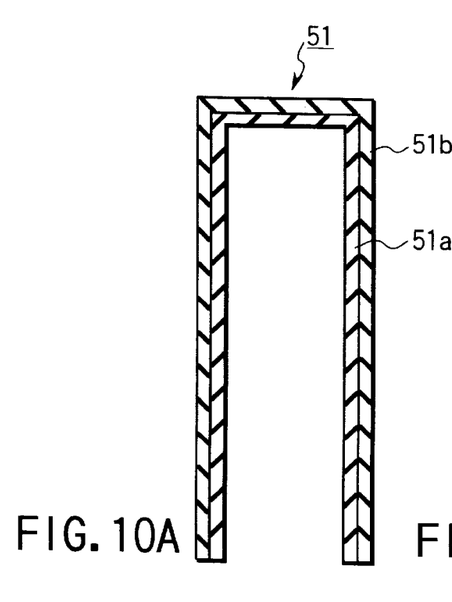
FIGS. 10A and 10B are cross-sectional views each illustrating specific an embodiment of the furnace tube of the heat treating furnace shown in FIG. 9.

Namely, as shown in FIG. 10A, the inner wall of the furnace tube 51 may be constituted by a tubular quartz glass 51a comprising an E' center region having a concentration of $3\times10^{19}$ $cm^{-3}$ or more in E' center, and the outer wall of the furnace tube 51 may be constituted by a tubular quartz glass (ordinary quartz glass) 51b having a concentration of less than $3\times10^{19}$ $cm^{-3}$ in E' center.

Figure 10B:
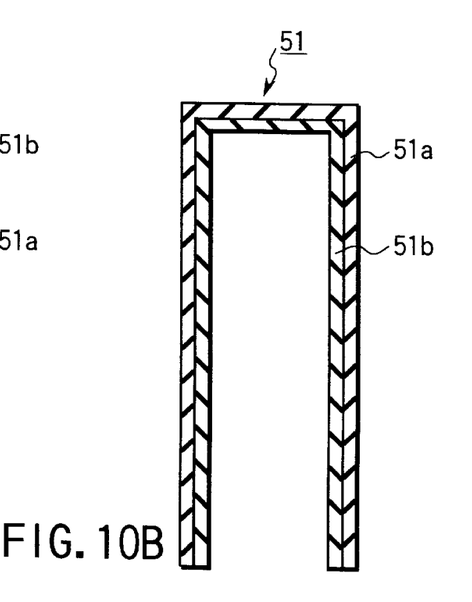

Alternatively, as shown in FIG. 10B, the inner wall of the furnace tube 51 may be constituted by a tubular quartz glass 51b, and the outer wall of the furnace tube 51 may be constituted by a tubular quartz glass 51a.

A second feature of the heat treating apparatus shown in FIG. 9 resides in the provision of a gas flow passage for flowing a non-oxidizing gas 53 containing 100 ppm or less of an oxidizing gas, which is formed between the furnace tube 51 and a heat-equalizing tube 52 disposed externally to the furnace tube 51 so as to render the outer wall of the furnace tube 51 to be directly contacted with the non-oxidizing gas 53. The non-oxidizing gas 53 is allowed to enter through a gas inlet tube 54 into the gas flow passage and discharged from a gas outlet tube 55.

The reason for limiting the content of the oxidizing gas in the non-oxidizing gas 53 is that the concentration of the E' center in the quartz glass constituting the furnace tube 51 is diminished by a heat treatment in an oxidizing gas atmosphere. Specific examples of the non-oxidizing gas 53 are nitrogen gas, hydrogen gas and an inert gas such as argon gas, etc.

The reference numeral 56 in FIG. 9 denotes a susceptor. Other structural members not shown herein may be the same as those of the conventional apparatus.

The heat treating method by making use of this heat treating apparatus can be performed as follows. Namely, a silicon wafer (not shown) placed in the furnace tube 51 is heat-treated by a heating means (not shown) while allowing an non-oxidizing gas to flow through a passage between the furnace tube 51 and the heat-equalizing tube 52 disposed externally to the furnace tube 51 at a flow rate of 16 liter per minute for example.

During this heat treatment, the metallic impurities originally existed in the furnace tube 51 are trapped by the E' center region in the quartz glass constituting the furnace tube 51, and also the metallic impurities which have been desorbed from the constituent members (such as the heat-equalizing tube 52) other than the furnace tube 51 and adsorbed (adhered) on the outer wall of the furnace tube 51 are trapped by the E' center region in the quartz glass as the metallic impurities diffuse into the interior of the furnace tube 51.

Therefore, the metallic impurities can be scarcely desorbed from the inner wall of the furnace tube 51, whereby solving the problem of contamination of silicon wafer due to metallic impurities. As a result, the percent defective of semiconductor element can be sufficiently minimized.

Further, since a non-oxidizing gas flow is employed in this example, the reduction of the E' center region in the quartz glass constituting the furnace tube 51 during the heat treatment can be effectively prevented. As a result, the effect of preventing the desorption of metallic impurities can be sufficiently assured during the heat treatment, and hence any possibility that a silicon wafer is contaminated by metallic impurities can be extremely minimized.

Moreover, the metallic impurities that have been desorbed from the liner tube 52 can be discharged, together with the non-oxidizing gas, from the gas outlet tube 55 to the outside of the apparatus. This also contributes to the minimization of the contamination by metallic impurities.

EXAMPLE 7

Figure 11:
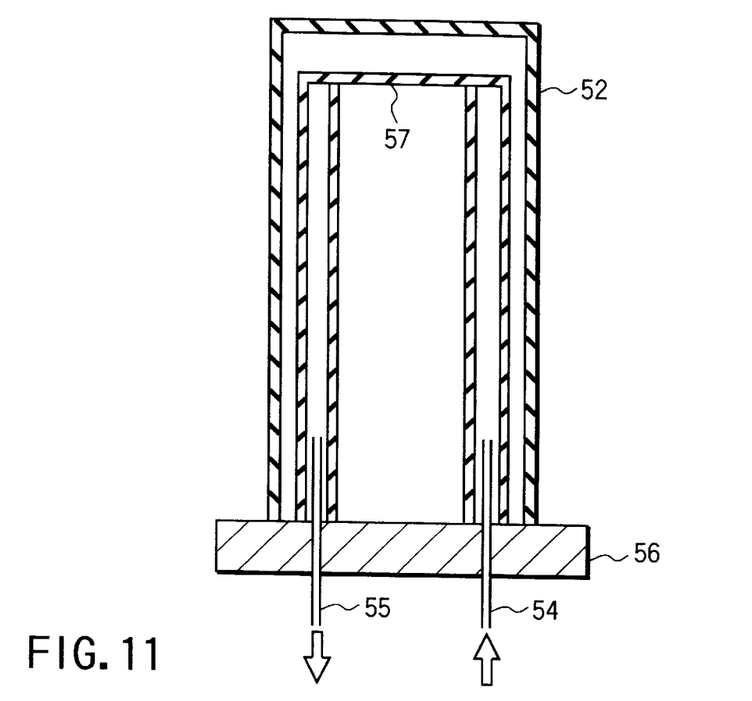
FIG. 11 is a cross-sectional view of the heat treating furnace of a heat treating apparatus according to a seventh example of this invention.

FIG. 11 is a cross-sectional view illustrating a main portion (heat treating furnace) of heat treating apparatus according to a seventh example of this invention. The same portions as those of the heat treating apparatus of FIG. 9 are indicated by the same reference numerals in FIG. 11 whereby omitting the detailed illustrations thereof (the same in the other examples).

The features of the heat treating apparatus of this example which differ from the sixth example are that a 2-ply tube 57 was employed as a furnace tube and that a gas flow passage for flowing a non-oxidizing gas 53 containing 100 ppm or less of an oxidizing gas is formed between the inner tube and the outer tube of the 2-ply tube 57. The 2-ply tube 57 is constituted, as in the case of the furnace tube 51, by a quartz glass comprising an E' center region having a concentration of $3 \times 10^{19}$ cm$^{-3}$ or more in E' center.

The heat treating method by making use of this heat treating apparatus can be performed as follows. Namely, a silicon wafer (not shown) placed in the 2-ply tube 57 is heat-treated by a heating means (not shown) while allowing an non-oxidizing gas to flow through the passage between the inner tube and the outer tube of the 2-ply tube 57 at a flow rate of 18 liter per minute for example.

During this heat treatment, the metallic impurities originally existed in the outer tube of the 2-ply tube 57 are trapped by the E' center region in the outer tube of the 2-ply tube 57, so that the metallic impurities can be substantially prevented from diffusing into the inner tube of the 2-ply tube 57 from the outer tube of the 2-ply tube 57.

Likewise, the metallic impurities which have been desorbed from the constituent members (such as the liner tube 52) other than the 2-ply tube 57 and adsorbed (adhered) on the surface of outer tube of the 2-ply tube 57 are trapped by the E' center region in the outer tube of the 2-ply tube 57. Accordingly, in this case also, the metallic impurities can be substantially prevented from diffusing into the inner tube of the 2-ply tube 57 from the outer tube of the 2-ply tube 57.

On the other hand, the metallic impurities which have been desorbed from the surface of the outer tube of the 2-ply tube 57 and adsorbed (adhered) on the outer wall of the inner tube of the 2-ply tube 57 are trapped by the E' center region in the inner tube of the 2-ply tube 57 as the metallic impurities diffuse toward the inner wall of the inner tube. Accordingly, the metallic impurities can be substantially prevented from being desorbed from the inner tube of the 2-ply tube 57.

Therefore, it is now possible according to this example to solve the problem of the contamination of silicon wafer due to metallic impurities in the 2-ply tube 57. Additionally, almost the same effects as obtained in the seventh example can be obtained. This example can be variously modified as in the cases of the aforementioned examples.

EXAMPLE 8

Figure 12:
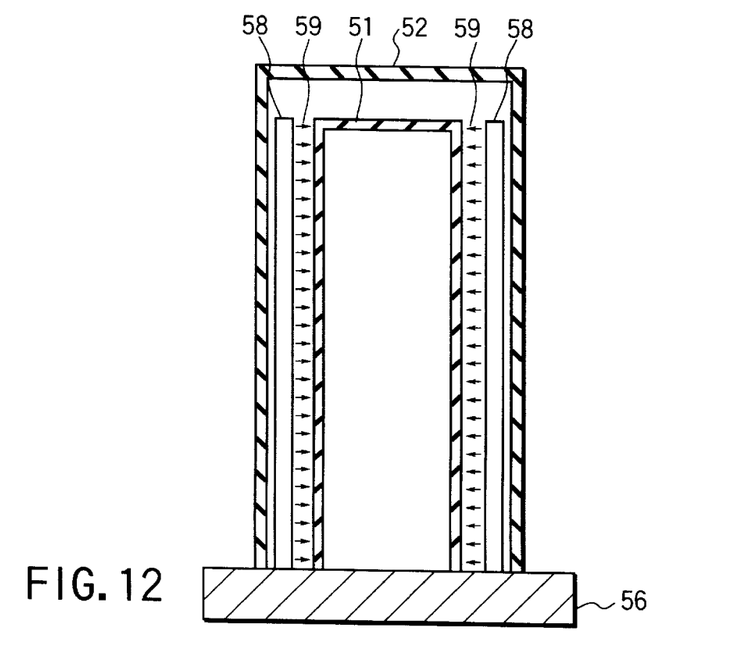
FIG. 12 is a cross-sectional view of the heat treating furnace of a heat treating apparatus according to an eighth example of this invention.

FIG. 12 is a cross-sectional view illustrating a main portion (heat treating furnace) of heat treating apparatus according to an eighth example of this invention.

The main point of the heat treating apparatus of this example which differs from the sixth example is that, instead of flowing a non-oxidizing gas, an irradiation of ultraviolet ray is employed.

Namely, an ultraviolet ray generator 58 is mounted so as to surround the furnace tube 51. This ultraviolet ray generator 58 is adapted to irradiate ultraviolet ray 59 having a wavelength of 245 nm onto the outer wall of the furnace tube 51.

The heat treating method by making use of this heat treating apparatus can be performed as follows. Namely, a silicon wafer (not shown) placed in the furnace tube 51 is heat-treated by a heating means (not shown) while irradiating ultraviolet ray 59 having a wavelength of 245 nm onto the outer wall of the furnace tube 51.

In this case, as a result of the irradiation of the ultraviolet ray 59, the concentration of E' center in the surface region of the outer wall of the furnace tube 51 is increased or the reduction in concentration of E' center can be inhibited.

As a result, the trapping effect of metallic impurities in the surface region of the outer wall of the furnace tube 51 in particular can be sufficiently increased or maintained during the heat treatment. Accordingly, the effect of preventing the desorption of metallic impurities can be sufficiently increased or maintained during the heat treatment, thus prominently minimizing any possibility of contaminating a silicon wafer with metallic impurities.

In this example, ultraviolet ray was irradiated. However, it is also possible to employ, in place of ultraviolet ray, X-ray, γ-ray, electron beam or laser beam. The diffusion furnace to be employed in this example may be a heat treating furnace of hot wall type utilizing a resistance heating or a heat treating furnace of cold type mainly utilizing an infrared heating.

This invention should not be construed to be limited to the aforementioned examples. For example, in addition to the aforementioned heat treating apparatus and methods, this invention is also applicable to a low pressure processing apparatus or method, such as an LP-CVD apparatus or method. Specifically, this invention is applicable to an LP-CVD apparatus or method for forming a polysilicon film, an oxide film, a nitride film, etc. In these cases, these films can be prevented from being contaminated with metallic impurities.

Furthermore, this invention can be applied to an epitaxial growth apparatus or method. Specifically, this invention is applicable to an epitaxial growth apparatus or method for forming an epitaxial silicon film. In this case, the epitaxial silicon film can be prevented from being contaminated with metallic impurities.

This invention is also applicable, in addition to the film-forming apparatus or method, to a modifying apparatus or method. Specifically, this invention is applicable to a hydrogen annealing apparatus or method for modifying a silicon substrate. In this case, the silicon substrate can be prevented from being contaminated with metallic impurities.

This invention is also applicable to a quartz crucible to be employed in a pulling process of a monocrystalline silicon substrate. In this case, the monocrystalline silicon substrate can be prevented from being contaminated with metallic impurities.

This invention can be variously modified within a spirit of this invention.

As explained above, it is possible according to this invention to effectively trap metallic impurities by making use of a region having an E' center at a concentration of $3 \times 10^{19}$ cm$^{-3}$ or more (E' center region), so that it is now possible to provide a quartz glass which would not become a source for the contamination even if the quartz glass contains metallic impurities.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A method of manufacturing a quartz glass which comprises the steps of;

forming an initial quartz glass by melting and quenching a raw material for quartz glass; and implanting therein an ion, which is capable of entering into an $SiO_2$ network of the initial quartz glass and substantially incapable of externally diffusing, to increase a concentration of E' center in at least part of the initial quartz glass, wherein said concentration of E' center is $3\times10^{19}$ cm$^{-3}$ or more as measured by means of an electron spin resonance analysis.

2. The method of manufacturing a quartz glass according to claim 1, wherein said ion is selected from the group consisting of silicon, nitrogen, carbon and aluminum.

3. The method of manufacturing a quartz glass according to claim 1, wherein a dosage of said ion is $5\times10^{14}$ cm$^{-2}$ or more.

4. The method of manufacturing a quartz glass according to claim 3, wherein a dosage of said ion is in the range of from $1\times10^{15}$ cm$^{-2}$ or more.

5. The method of manufacturing a quartz glass according to claim 3, wherein a dosage of said ion is in the range of from $1\times10^{15}$ cm$^{-2}$ to $1\times10^{16}$ cm$^{-2}$.

6. A method of manufacturing a quartz glass which comprises the steps of;

mixing 0.01 to 0.1% by weight of silicon into a raw material for quartz glass;

melting the raw material for quartz glass mixed with said silicon to obtain a melt; and quenching said melt, so a concentration of E' center is $3\times10^{19}$ cm$^{-3}$ or more as measured by means of an electron spin resonance analysis.

7. A method of manufacturing a quartz glass which comprises the steps of;

melting a raw material for quartz glass to obtain a melt;

quenching said melt thereby to form an initial quartz glass; and irradiating ultraviolet-rays to said initial quartz glass, so a concentration of E' center is $3\times10^{19}$ cm$^{-3}$ or more as measured by means of an electron spin resonance analysis.

8. A method of manufacturing a quartz glass to which comprises the steps of;

melting a raw material for quartz glass to obtain a melt;

quenching said melt thereby to form an initial quartz glass; and giving an abrasion damage to surface of said initial quartz by applying a sand blast to said surface of initial quartz glass, so a concentration of E' center is $3\times10^{19}$ cm$^{-3}$ or more as measured by means of an electron spin resonance analysis.

* * * * *

UNITED STATES PATENT AND TRADEMARK OFFICE
CERTIFICATE OF CORRECTION

PATENT NO. : 6,263,704 B1
DATED : July 24, 2001
INVENTOR(S) : Hiroshi Tomita et al.

It is certified that error appears in the above-identified patent and that said Letters Patent is hereby corrected as shown below:

Column 14, claim 8,
Line 19, "to surface" should read -- to a surface --.

Signed and Sealed this

Sixteenth Day of April, 2002

Attest:

JAMES E. ROGAN
Attesting Officer
Director of the United States Patent and Trademark Office